3,756,845
METHOD FOR IMPROVING ADHESION OF POLY-
URETHANE COATINGS TO SUBSTRATES
Ronald J. Zasadny, Wyandotte, and James A. Gallagher and Herbert Phelps Trix, Grosse Ile, Mich., assignors to BASF Wyandotte Corporation, Wyandotte, Mich.
No Drawing. Filed Apr. 27, 1971, Ser. No. 137,999
Int. Cl. B32b 13/12, 27/40
U.S. Cl. 117—72                                                                              8 Claims

ABSTRACT OF THE DISCLOSURE

Masonry products and other substrates primed with an organic isocyanate prior to applying a urethane composition thereon exhibit improved adhesion, a water resistant bond, 100% cohesive failure, and 0% adhesive failure.

BACKGROUND OF THE INVENTION

(1) Field of the invention

The present invention pertains to urethane-coated substrates and the like. More particularly, the present invention concerns priming compounds or primers for suitable substrates prior to the application thereto of a urethane coating or sealant. Even more particularly, the present invention concerns the use of organic isocyanates as primers for masonry products prior to the application thereto of a urethane coating.

(2) Prior art

The use of urethane and urethane-containing coating compositions for suitable substrates, such as, leather, wood, masonry products, e.g., concrete, cement, and the like is known. These film-forming compositions have enjoyed reasonable success which is attributable to their excellent properties, such as, chemical inertness, high tensile strength, flexibility, extensibility and adhesion to the substrate. However, these prior art compositions have the inherent disadvantage of poor wet strength adhesion upon prolonged exposure to moisture, such as, by immersion in water.

Thus, if this poor wet strength adhesion of such compounds could be improved, the utility thereof would be vastly improved.

SUMMARY OF THE INVENTION

It has now been found that if a suitable substrate is primed with an organic isocyanate prior to the application thereto of a polyurethane composition the wet strength adhesion of the urethane to the substrate is increased.

The organic isocyanate advantageously employed herein is either (1) a polymethylene polyphenylisocyanate corresponding to the formula:

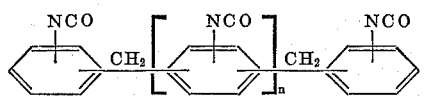

wherein $n$ has an average value greater than about 0.2 and a maximum of about 2.0, (2) hydrogenated methylene diphenyldiisocyanate, or (3) a quasi-prepolymer prepared by reacting an 80:20 weight mixture of 2,4- and 2,6-toluene diisocyanate and an organic glycol having an average molecular weight of from 60 to 2,000 and prepared in an equivalent weight ratio of NCO/OH of greater than 2.0/1.0, and preferably from 2.1/1 to 4.5/1 and wherein the prepolymer has a minimum —NCO content of 18%.

It is also contemplated by the present invention that the primer be employed as a solution of isocyanate in an inert solvent.

Any of the conventional and well-known polyurethane or polyurethane-containing compositions can be applied to the primed substrate to produce the coated product.

For a more complete discussion of the present invention reference is made to the following detailed description and examples thereof.

DESCRIPTION OF THE PREFERRED EMBODIMENT

In accordance with the present invention the adhesion of polyurethane or polyurethane-containing, film-forming, coating compositions or sealants to suitable substrates, such as, masonry and the like, is greatly improved by priming the substrate with an organic polyisocyanate having a high free —NCO content prior to applying the coating composition thereon.

The organic polyisocyanate which is most advantageously employed herein is either (1) a polymethylene polyphenylisocyanate corresponding to the formula:

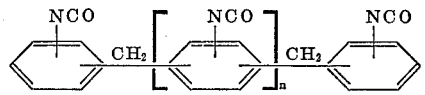

wherein $n$ has a value greater than about 0.2 and a maximum value of about 2.0, (2) hydrogenated methylene diphenyldiisocyanate, or (3) a quasi-prepolymer which is the reaction product of an 80:20 weight mixture of 2, 4- and 2,6-toluene diisocyanate and an organic glycol having an average molecular weight of about from 60 to 2,000 reacted in an equivalent weight ratio of NCO/OH of greater than 2.0/1.0 and preferably from about 2.1/1 to 4.5/1 and wherein the prepolymer has minimum free —NCO content of about 18%.

The term "isocyanate quasi-prepolymer" as used herein means the reaction product of an organic polyisocyanate and a minor amount of a compound having at least two active hydrogens. Generally these compounds are prepared by reacting more than 2 equivalents of the isocyanate compound with one equivalent of the active hydrogen containing compound. These compounds are, thus, seen to comprise predominantly isocyanate compounds having minor amounts of urethane linkages contained therein. The active hydrogen compounds which can be used to prepare quasi-prepolymers are more fully discussed, infra, in the discussion pertaining to the preparation of the coating composition.

In preparing the quasi-prepolymers specifically adapted for use herein it is preferred that the active hydrogen containing compound be an organic glycol, such as, ethylene glycol, propylene glycol, 1,4-butane diol, polyethylene glycol, polypropylene glycol, or the like, having a molecular weight of from about 60 to 2,000 and preferably from about 400 to 2,000. As noted above, the quasi-prepolymer is prepared, preferably, in an NCO/OH equivalent weight ratio of from about 2.1/1.0 to 4.5/1.0, and has a minimum free —NCO content of 18%.

Other organic polyisocyanates which can be used herein include, for example, m-xylene diisocyanate, an 80:20 weight mixture of 2,4- and 2,6-toluene diisocyanate and hydrogenated tolylene diisocyanate and other isocyanate quasi-prepolymers.

Some of the useful isocyanate compounds enumerated herein do create problems where they are used in confined areas due to their toxicity. For example, the quasi-prepolymers are toxic. Thus, although the particularly defined quasi-prepolymer primer promotes 100% cohesive failure and 0% adhesive failure for the urethane coating or sealant, its utility is confined solely to open areas, such as, in highway construction and the like. Thus, to avoid the toxicity problem it is particularly preferred to employ polymethylene polyphenylisocyanate and hydrogenated methylene diphenyldiisocyanate as the primer.

It has been found that if any of the preferred group of isocyanates is employed as the primer then 100% cohesive failure and 0% adhesive failure of the coating is obtained. The other possible isocyanates, as mentioned above, although being excellent adhesion promoters, do not provide such high results in view of either their toxicity, failure to provide 100% cohesive failure and 0% adhesive failure of the coating, or both.

The term polymethylene polyphenylisocyate as used herein and in the appended claims is meant to include, in addition to the above-defined compound, the polymeric form of methylene diphenyldiisocyanate.

Polymethylene polyphenylisocyanate is a commercially available product which is generally prepared by the phosgenation of the reaction product of aniline and formaldehyde in the presence of an acid catalyst and having greater than two isocyanate equivalents per molecule thereof.

In priming the substrate, which is preferably a masonry substrate, the isocyanate is applied as a solution thereof in an inert solvent. An inert solvent, as defined herein, means a solvent for the isocyanate which is unreactive therewith. Suitable solvents include aromatic hydrocarbons, aliphatic hydrocarbons, ketones, ethers, esters and the like. Representative aromatic hydrocarbon solvents are, for example, benzene, toluene, xylene and the like. Suitable aliphatic hydrocarbon solvents are, for example, hexane, heptane, and the like. Other suitable solvents include, acetone, methylethylketone, cellosolve acetate, carbon tetrachloride, chloroform, dimethylformamide, tetrahydrofuran, dimethylsulfoxide and the like.

The solutions are prepared by dissolving the isocyanate in the solvent. The solutions generally contain from about 4% to 100% by weight of isocyanate based on the total weight of the solution. Preferably the solution contains from about 20% to 40% by weight of isocyanate based on the total weight of the solution.

After the primer is applied to the substrate a polyurethane or polyurethane-containing coating composition can be applied directly thereon without waiting for the primer to dry. The coating can be selected from any one of the conventional and well-known polyurethane compositions. The preparation of these polyurethanes is disclosed in many references, including the texts entitled "Polyurethanes" by Bernard A. Dombrow, published by Reinhold Publishing Corporation, New York, N.Y., 1957, and "Polyurethanes: Chemistry and Technology," by J. H. Saunders and K. C. Frisch, published by Interscience Publishers, New York-London. Generally, these compositions are regarded as the reaction product of a polyisocyanate and an active hydrogen containing organic compound such as a hydroxy-terminated polyester, polyesteramine, amide, or polyether. The term "active hydrogen atoms" refers to hydrogens which display activity according to the Zerewitinoff test, as described by Kohler in J. Am. Chem. Soc., 49, 3181, (1927).

The polyisocyanates which are conventionally employed in preparing polyurethanes include, for example, aromatic diisocyanates, such as, toluene diisocyanate, 4,4'-diphenylmethane diisocyanate, 1,5-naphthalene diisocyanate, and the like and polymethylene diisocyanates, such as, tetramethylene diisocyanate and hexamethylene diisocyanate.

In general, any organic compound containing at least two active hydrogen atoms may be employed in the coating composition for reaction with the polyisocyanate to produce a polyurethane. Examples of suitable types of organic compounds containing at least two active hydrogen groups are castor oil, hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, as well as mixtures thereof.

Any suitable hydroxyl-containing polyester may be used such as are obtained, for example, from polycarboxylic acids and polyhydric alcohols. Any suitable polycarboxylic acid may be used, such as, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconi acid, β-hydromuconic acid, α,butyl-α-ethyl-glutaric acid, α-β-diethyl-succinic acid, isophthalic acid, terephthalic acid, hemimellitic acid, and 1,4-cyclohexanedicarboxylic acid. Any suitable polyhydric alcohol including both aliphatic and aromatic may be used, such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol, such as, 2,2-(4,4'-hydroxyphenyl) propane, commonly known as Bisphenol A.

Any suitable polyalkylene polyether polyol may be used, such as, the polymerization product of an alkylene oxide or of a mixture of alkylene oxides with a polyhydric alcohol. Any suitable polyhydric alcohol may be used, such as, those disclosed above for use in the preparation of the hydroxyl-containing polyesters. Any suitable alkylene oxide may be used, such as, ethylene oxide, propylene oxide, butylene oxide, amylene oxide, and heteric or block copolymers of these oxides. The polyalkylene polyether polyols may be prepared from other starting materials, such as, tetrahydrofuran and alkylene oxide-tetrahydrofuran copolymers; epihalohydrins, such as, epichlorohydrin; as well as aralkylene oxides, such as, styrene oxide. The polyalkylene polyether polyols may have either primary or secondary hydroxyl groups and, preferably, are polyethers prepared from alkylene oxides having from 2 to 6 carbon atoms, such as polyethylene ether glycols, polypropylene ether glycols and polybutylene ether glycols. The polyalkylene polyether polyols may be prepared by any known process, such as, for example, the process disclosed by Wurtz in 1859 in Encyclopedia of Chemical Technology, vol. 7, pp. 257–262, published by Interscience Publishers, Inc. (1951) or in U.S. Pat. No. 1,922,-459.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols, poly-1,2-oxybutylene and polyoxyethylene glycols and poly-1,4 - oxybutylene and polyoxyethylene glycols, and random copolymer glycols prepared from blends or sequential addition of two or more alkylene oxides. Also, adducts of the above with trimethylolpropane, glycerine and hexanetriol as well as the polyoxypropylene adducts of higher polyols, such as, pentaerythritol and sorbitol, may be employed. Thus, the polyether polyols which can be employed in this process are oxyalkylene polymers which have an oxygen/carbon atom ratio from about 1:2 to 1:4 and preferably an oxygen/carbon atom ratio from about 1:2.8 to 1:4 and from about 2 to 6 terminal hydroxyl groups and preferably about 2 to 4 terminal hydroxyl groups. The polyether polyols generally have an average equivalent weight from about 150 to 5000 and preferably have an average equivalent weight from about 200 to 2000. Polyoxypropylene glycols having molecular weights from about 400 to 2500 corresponding to equivalent weights from about 200 to 1250 and mixtures thereof are particularly useful as polyol reactants. Also, polyol blends such as a mixture of high molecular weight polyether polyols with lower molecular weight polyether polyols or monomeric polyols can be used in preparing the polyurethane.

Any suitable polyhydric polythioether may be used, such as, for example, the condensation product of thiodiglycol or the reaction product of a dihydric alcohol, such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol, such as, ethanolamine, with the polycarboxylic acids set forth above or they may be made using the same components that make up the hydroxyl-containing polyester with only a portion of the components being a diamine, such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used, such as, for example, the reaction product of formaldehyde or other suitable aldehyde with a dihydric alcohol or an alkylene oxide such as those disclosed above.

Other compounds which do not necessarily fit within any of the previously set forth classes of compounds which are quite suitable in the compositions of the present invention include the hydroxy-terminated polyurethane polymers, such as, a hydroxy-terminated polymer made by reacting an isocyanate with several moles of an alkylene glycol.

A conventional catalyst of the type normally used in the prior art for reacting isocyanates with active hydrogen-containing compounds to produce polyurethanes is preferably incorporated in the composition of this invention to increase the conversion rate of the system. The amount of the catalyst generally corresponds to about 0.01 to 5.0% of the combined weight of the polyisocyanate and the active hydrogen-containing compound. Suitable catalysts for this purpose include diethylene triamine ketimine, tetramethylethylene diamine, triethylene diamine, tetramethylbutane diamine, tetramethyl guanidine, trimethyl piperazine and metallo-organic salt catalysts which are polyvalent metal salts of an organic acid having up to about 18 carbon atoms and being void of active hydrogen atoms. The organo portion of the salt may be either linear or cyclic and saturated or unsaturated. The polyvalent metal has a valence from about 2 to 4. Typical metallo-organic salts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis (phenyl mercury)dodecenyl succinate, phenyl mercuric benzoate, cadmium naphthenate, dibutyltin dilaurate, dibutyltin-di-2-ethylhexoate, and the like.

In addition to the principal components other additives or ingredients which may be employed in the formulation in order to impart special properties to this composition include fillers and pigments. The amount of filler preferably ranges from about 20 to 120% of the total weight of the composition and the amount of pigment preferably ranges from about 3 to 100% of the total weight of the composition. Examples of suitable fillers are aluminum silicate, calcium silicate, magnesium silicate, calcium carbonate, barium sulfate, calcium sulfate, carbon blacks, silica and the like.

Examples of suitable pigments are titanium dioxide, zinc oxide, iron oxides, antimony oxide, chrome greens, chrome yellow, iron blue, siennas, molybdate oranges, organic pigments, such as, para reds, benzidine yellow, toluidine red, toners, phthalocyanines and the like.

In a preferred embodiment of the present invention a masonry substrate is expunged of any dirt or the like and allowed to dry. The organic isocyanate primer is then applied at room temperature to the dry substrate by any conventional means such as by spraying or by manual application with a paint brush or the like. Immediately after the primer is applied to the substrate, the urethane composition is applied, in like manner, thereover. The coating then cures at ambient temperature to a tough, highly adherent coating.

For a more complete understanding of the present invention reference is made to the following examples. In the examples all parts and percentages are by weight absent indications to the contrary.

EXAMPLE I

A concrete slab measuring 2" x 1½" x 6" was washed with water and air dried. A 33% primer solution of polymethylene polyphenylisocyanate having an $n$ value of 0.6 and dissolved in toluene was then applied to the slab with a paint brush. Immediately after the primer was applied to the slab a polyurethane coating composition was poured thereover. The coating was then allowed to cure for three days at room temperature.

After the three day period elapsed the coated slab was then immersed for three days in water maintained at 75° to 80° F. After the three day immersion period had elapsed the coating was tested for wet adhesive strength by affixing the slab and coating in an "Instron" tester and peeling the coating from the concrete substrate at an angle of 180° at a crosshead speed of two inches per minute. The coating exhibited a wet adhesive strength of 10 lbs./in. and suffered 100% cohesive failure.

When the procedure was repeated without priming the slab prior to applying the coating, the coating suffered 100% adhesive failure and exhibited a wet strength adhesion of 1.5 lbs./in.

In this example the urethane coating composition employed was prepared from 100 parts of a propylene oxide adduct of trimethylolpropane having a molecular weight of about 2500; 143 parts of a tolylene diisocyanate adduct of a polyoxypropylene glycol having a molecular weight of about 2000, and prepared in an NCO/OH ratio of 2:1; 100 parts of a clay filler; 100 parts of coal tar and in the presence of 6 parts of di(phenylmercury) dodecenylsuccinate catalyst.

This coating possessed the following physical properties:

| | |
|---|---|
| Tensile strength, p.s.i. | 185 |
| Elongation, percent | 260 |
| Split tear strength, p.i. | 15 |
| Shore A Hardness: | |
|    Instantaneous | 30 |
|    5 seconds | 30 |
| Modulus, percent, p.s.i.: | |
|    200 | 160 |
|    150 | 135 |
|    100 | 105 |
|    50 | 65 |

EXAMPLE II

Following the procedure of Example I, a concrete slab primed with hydrogenated methylene diphenyldiisocyanate and coated with the same coating composition as employed in Example I exhibited a wet strength adhesion of 12 lbs./in. and suffered 100% cohesive failure.

The hydrogenated methylene diphenyldiisocyanate was employed as a 33% solution thereof in toluene.

EXAMPLE III

To evidence improved dry strength adhesion of polyurethane compositions when primed with an isocyanate, a concrete slab, after being cleansed of dirt and air dried, was primed with a polymethylene polyphenylisocyanate and immediately thereafter a polyurethane coating material was applied thereon. After curing for three days at room temperature the dry strength adhesion of the coating was measured as in Example I. The coating, which suffered 100% cohesive failure, exhibited a dry strength adhesion of 10.5 lbs./in.

When this procedure was repeated without priming the slab the coating suffered 100% adhesive failure and exhibited a dry strength adhesion of only 5 lbs./in.

The polyurethane coating employed herein was the same as that used in Example I.

EXAMPLE IV

To evidence the utility of the present invention with various polyurethane coating compositions a series of compositions were prepared and deployed by the procedure of Example I after the concrete slab was first primed with a 33% polymethylene polyphenylisocyanate solution in toluene.

This procedure was then repeated by applying the coatings to unprimed slabs and comparative wet strength adhesion data was thereby obtained. The results of these tests are set forth below in Table I.

In this example the following coating compositions were employed.

Composition A.—prepared from 100 parts of a 4000 molecular weight polyoxypropylene adduct of trimethylolpropane, 100 parts of a chlorinated polyphenyl plasticizer, 130 parts of a clay filler, 7 parts carbon black, 0.85 part of a di(phenylmercury) dodecenylsuccinate catalyst, and 91 parts of tolylene diisocyanate adduct of a 2000 molecular weight polyoxypropylene glycol prepared in an NCO/OH ratio of about 2:1.

Composition B.—prepared from 100 parts of a 4000 molecular weight polyoxypropylene adduct of trimethylolpropane, 40 parts of a clay filler, 40 parts of a calcium carbonate filler, 10 parts of a titanium dioxide pigment, 2 parts of a castor oil derivative, 4 parts of the same catalyst as used in composition A and 91 parts of the same isocyanate as used in composition A.

Composition C.—prepared from 100 parts of a 6000 molecular weight propylene oxide adduct of trimethylolpropane capped with 5% ethylene oxide, 100 parts of a 1500 molecular weight propylene oxide adduct of trimethylolpropane, 100 parts of a chlorinated polyphenyl plasticizer, 240 parts of a clay filler, 5 parts of pigment, 12 parts of the same catalyst as used in composition A and 310 parts of the same isocyanate as used in composition A.

TABLE I

| Composition | Days Immersion in water | Wet adhesion in lbs./in. to— Primed substrate | Wet adhesion in lbs./in. to— Unprimed substrate | Failure |
|---|---|---|---|---|
| A | 2 | 16.5 | | 100% cohesion. |
| A | 2 | | 7 | 100% adhesion. |
| B | 3 | 15 | | 100% cohesion |
| B | 3 | | 4.2 | 100% adhesion |
| C | 2 | 6 | | 100% cohesion. |
| C | 2 | | 0.8 | 100% adhesion. |

The greatly improved adhesive properties of urethane coatings to substrates primed in accordance primed in accordance with the present invention is evident from a review of this data.

EXAMPLE V

Following the procedure of Example I a cleaned concrete slab was primed with a 33% solution of quasi-prepolymer in toluene and thereafter coated with a conventional urethane coating. After three days immersion in water, the coating had a wet strength adhesion of 12 lbs./in. and suffered 100% cohesive failure.

The quasi-prepolymer employed herein was prepared from a polypropylene glycol having a molecular weight of about 400 and an 80:20 weight mixture of 2,4- and 2,6-toluene diisocyanate in an NCO/OH equivalent weight ratio of 4.5/1.0, the prepolymer having a free —NCO content of about 24%.

The coating was prepared from 100 parts of 2500 molecular weight propylene oxide adduct of trimethylolpropane, 100 parts of a coal tar, 100 parts of a clay filler, 6 parts of di(phenylmercury) dodecenylsuccinate catalyst, and 143 parts of a tolylene diisocyanate adduct of a 2000 molecular weight polyoxypropylene glycol prepared in an NCO/OH ratio of about 2:1.

What is claimed is:

1. In a method for coating a masonry substrate with a polyurethane composition the improvement comprising:
    priming the masonry substrate prior to applying the polyurethane coating composition thereto, with a solution of an organic isocyanate in a solvent inert for the isocyanate, said isocyanate being selected from the group consisting of polymethylene polyphenylisocyanate, hydrogenated methylene diphenyldiisocyanate, and a quasi-prepolymer which is the reaction product of an 80:20 weight mixture of 2,4- and 2,6-toluene diisocyanate and an organic glycol having an average molecular weight of from about 60 to 2000, the prepolymer being prepared in an NCO/OH equivalent ratio of from about 2.1/1.0 to 4.5/1.0, and having a minimum free —NCO content of 18%.

2. The method of claim 1 wherein the isocyanate is present in the solution in an amount of at least about 4% by weight based on the total weight of the solution.

3. The method of claim 1 wherein the isocyanate is polymethylene polyphenylisocyanate.

4. The method of claim 1 wherein the isocyanate is hydrogenated methylene diphenyldiisocyanate.

5. The method of claim 1 wherein the isocyanate is the quasi-prepolymer and the glycol is selected from the group consisting of ethylene glycol, propylene glycol, 1,4-butane diol, polyethylene glycol and polypropylene glycol.

6. The method of claim 5 wherein the isocyanate is the quasi-prepolymer and wherein the glycol is a polypropylene glycol having a molecular weight of about 400, the quasi-prepolymer being prepared in an NCO/OH ratio of 4.5/1.0 and having a 24% free —NCO content.

7. A masonry substrate having a surface coated with a primer coating which when applied consisted essentially of:
    (a) an organic isocyanate selected from the group consisting of polymethylene polyphenylisocyanate, hydrogenated methylene diphenyldiisocyanate, and a quasi-prepolymer which is the reaction product of an 80:20 weight mixture of 2,4- and 2,6-toluene diisocyanate and an organic glycol having an average molecular weight of from about 60 to 2000, the prepolymer being prepared in an NCO/OH equivalent ratio of from about 2.1/1.0 to 4.5/1.0, the prepolymer having a minimum free —NCO content of 18%, and
    (b) an inert solvent for the organic isocyanate and superimposed over said primer coating, a top coating, a top coating of a polyurethane composition.

8. The masonry substrate of claim 7 wherein said primer coating contained at least about 4% by weight of isocyanate based on the total weight of said primer, the balance of said primer being said inert solvent.

References Cited

UNITED STATES PATENTS

| | | | |
|---|---|---|---|
| 3,218,215 | 11/1965 | Achterhof et al. | 117—161 KP |
| 3,023,126 | 2/1962 | Underwood et al. | 117—161 KP |
| 3,074,911 | 1/1963 | Harper | 117—123 D |
| 3,240,620 | 3/1966 | Artwell | 117—72 |
| 3,607,536 | 9/1971 | Bragole | 117—161 KP |
| 3,198,692 | 8/1965 | Bridgeford | 117—72 |
| 3,518,107 | 6/1970 | Millen | 117—123 D |
| 3,723,163 | 3/1973 | Schumacher | 117—72 |

FOREIGN PATENTS

| | | | |
|---|---|---|---|
| 451,803 | 10/1948 | Canada | 117—72 |

WILLIAM D. MARTIN, Primary Examiner

W. H. SCHMIDT, Assistant Examiner

U.S. Cl. X.R.

117—123 C, 123 D, 161 KP, DIG 7

PO-1050
(5/69)

UNITED STATES PATENT OFFICE
CERTIFICATE OF CORRECTION

Patent No. 3,756,845                    Dated September 4, 1973

Inventor(s) Ronald J. Zasadny, James A. Gallagher and Herbert Phelps Trix

It is certified that error appears in the above-identified patent and that said Letters Patent are hereby corrected as shown below:

Claim 1, line 27, please correct the spelling of the word "organic".

Claim 7, line 72, delete "a top coating,".

Claim 7, line 71, after the word "isocyanate" the rest of the claim should be brought to the left-hand margin as a part of the original paragraph.

Signed and sealed this 26th day of February 1974.

(SEAL)
Attest:

EDWARD M. FLETCHER, JR.            C. MARSHALL DANN
Attesting Officer                  Commissioner of Patents